(12) United States Patent
Tanaka

(10) Patent No.: US 8,130,620 B2
(45) Date of Patent: Mar. 6, 2012

(54) HOLOGRAM RECORDING/REPRODUCING DEVICE, METHOD THEREOF, AND HOLOGRAPHIC RECORDING MEDIUM

(75) Inventor: Tomiji Tanaka, Saitama (JP)

(73) Assignee: Sony Corporation, Tokyo (JP)

( * ) Notice: Subject to any disclaimer, the term of this patent is extended or adjusted under 35 U.S.C. 154(b) by 291 days.

(21) Appl. No.: 12/505,242

(22) Filed: Jul. 17, 2009

(65) Prior Publication Data

US 2010/0039918 A1  Feb. 18, 2010

(30) Foreign Application Priority Data

Aug. 13, 2008 (JP) ................................. 2008-208699

(51) Int. Cl.
  *G11B 7/00* (2006.01)
(52) U.S. Cl. ...................................... 369/103; 369/53.19
(58) Field of Classification Search .................. None
  See application file for complete search history.

(56) References Cited

U.S. PATENT DOCUMENTS 7,773,276 B2 * 8/2010 Hoskins et al. ................. 359/32
2006/0114792 A1 * 6/2006 Uno et al. ...................... 369/103

FOREIGN PATENT DOCUMENTS

JP  2005-032309  2/2005
JP  2007-141426  6/2007

* cited by examiner

*Primary Examiner* — Paul Huber
(74) *Attorney, Agent, or Firm* — Robert J. Depke; Rockey, Depke & Lyons, LLC

(57) ABSTRACT

A hologram recording/reproducing device includes an optical section which irradiates a holographic recording medium with an optical beam; and a control unit which controls the optical section. The optical section includes a laser light source which emits the optical beam, and a spatial modulator which modulates the optical beam. By controlling the spatial modulator, the control unit displays a tilt-standard reference light pixel and a tilt-standard signal light pixel, and records a tilt-standard hologram.

8 Claims, 8 Drawing Sheets

HOLOGRAM RECORDING/REPRODUCING DEVICE, METHOD THEREOF, AND HOLOGRAPHIC RECORDING MEDIUM

BACKGROUND OF THE INVENTION

1. Field of the Invention

The present invention relates to a hologram recording/reproducing device, a hologram recording/reproducing method, and a holographic recording medium.

2. Description of the Related Art

In recent years, a holographic memory has been popular as a high-capacity recording medium. The holographic memory is a memory using a holographic recording medium. For example, when a tilt amount of a holographic recording medium during recording differs from a tilt amount during reproducing by 0.05°, a brightness of a diffraction image may become uneven, and a diffraction efficiency may be attenuated to 67%. To prevent an error rate from being further decreased, a tolerance of tilting has to be further decreased to, for example, about 0.01°. As compared with a tolerance of tilting for a typical optical disk, for example, a DVD disk, the tolerance value of the holographic memory is a several-tenth part the tolerance value of the DVD disk, the tolerance value of the holographic memory being markedly small. Here, the tilt amount during recording differing from the tilt amount during reproducing represents that the tilt amounts vary during recording and reproducing. Even when the tilt amount during recording is about 0.n° (n being an integer), reproduction can be carried out as long as a difference between the tilt amount during recording and a tilt amount during reproducing is within, for example, 0.01°. That is, for a holographic memory, the relative difference between the tilt amount during recording and the tilt amount during reproducing is a key point.

Owing to this, in a hologram recording/reproducing device (holographic memory system) using such a holographic memory, a tilt amount is detected and tilting is corrected to decrease the tilt amount. For example, Japanese Unexamined Patent Application Publication No. 2005-32309 suggests a technique in which optical beams of recording light and reproducing light, to be incident on an objective lens, are moved parallel. Also, Japanese Unexamined Patent Application Publication No. 2007-141426 suggests a technique, in which, when using two-beam interference method, reproducing light is moved in radial and tangential directions, and reproduction is carried out in a state where SNR is in an optimum condition. Two-beam interference method and coaxial interference method are basic techniques for recording and reproducing a hologram.

SUMMARY OF THE INVENTION

However, Japanese Unexamined Patent Application Publication No. 2005-32309 does not specifically disclose how the tilt amount is detected. Also, Japanese Unexamined Patent Application Publication No. 2007-141426 discloses a technique which uses the two-beam interference method. Hence, it is difficult to apply the technique to the coaxial interference method. In addition, the technique features repetitive reproduction, resulting in a transfer rate being decreased.

Thus, it is desirable to provide a technique for detecting tilting of a holographic recording medium suitable for the coaxial interference method, and a technique for correcting tilting, thereby facilitating the detection of tilting.

A hologram recording/reproducing device according to an embodiment of the present invention includes an optical section which irradiates a holographic recording medium with an optical beam; and a control unit which controls the optical section. The optical section includes a laser light source which emits the optical beam, and a spatial modulator which modulates the optical beam. By controlling the spatial modulator, the control unit displays a tilt-standard reference light pixel, first and second tilt-standard signal light pixels arranged symmetrically to each other about the tilt-standard reference light pixel, and third and fourth tilt-standard signal light pixels arranged symmetrically to each other about the tilt-standard reference light pixel on a line different from a line connecting the first and second tilt-standard signal light pixels. The control unit records a first tilt-standard hologram in a region using the tilt-standard reference light pixel and the first tilt-standard signal light pixel, a second tilt-standard hologram in the same region using the tilt-standard reference light pixel and the second tilt-standard signal light pixel, a third tilt-standard hologram in the same region using the tilt-standard reference light pixel and the third tilt-standard signal light pixel, and a fourth tilt-standard hologram in the same region using the tilt-standard reference light pixel and the fourth tilt-standard signal light pixel.

With the hologram recording/reproducing device of the embodiment, the control unit displays the first and second tilt-standard signal light pixels arranged symmetrically to each other about the tilt-standard reference light pixel, and the third and fourth tilt-standard signal light pixels arranged symmetrically to each other about the tilt-standard reference light pixel on the line different from the line connecting the first and second tilt-standard signal light pixels. The control unit records the first to fourth tilt-standard holograms in the same region. During reproducing, a signal for tilt correction can be obtained from the holograms thusly recorded.

A hologram recording/reproducing method according to an embodiment of the present invention includes the steps of emitting an optical beam from a laser light source; displaying at a spatial modulator a tilt-standard reference light pixel, first and second tilt-standard signal light pixels arranged symmetrically to each other about the tilt-standard reference light pixel, and third and fourth tilt-standard signal light pixels arranged symmetrically to each other about the tilt-standard reference light pixel on a line different from a line connecting the first and second tilt-standard signal light pixels; and recording a first tilt-standard hologram in a region using the tilt-standard reference light pixel and the first tilt-standard signal light pixel, a second tilt-standard hologram in the same region using the tilt-standard reference light pixel and the second tilt-standard signal light pixel, a third tilt-standard hologram in the same region using the tilt-standard reference light pixel and the third tilt-standard signal light pixel, and a fourth tilt-standard hologram in the same region using the tilt-standard reference light pixel and the fourth tilt-standard signal light pixel.

With the hologram recording/reproducing method of the embodiment, the method includes displaying at the spatial modulator the first and second tilt-standard signal light pixels arranged symmetrically to each other about the tilt-standard reference light pixel, and the third and fourth tilt-standard signal light pixels arranged symmetrically to each other about the tilt-standard reference light pixel on the line different from the line connecting the first and second tilt-standard signal light pixels; and recording the first to fourth tilt-standard holograms in the same region. During reproducing, a signal for tilt correction can be obtained from the holograms thusly recorded.

A holographic recording medium according to an embodiment of the present invention is formed by a process including the steps of emitting an optical beam from a laser light source; displaying at a spatial modulator a tilt-standard reference light pixel, first and second tilt-standard signal light pixels arranged symmetrically to each other about the tilt-standard reference light pixel, and third and fourth tilt-standard signal light pixels arranged symmetrically to each other about the tilt-standard reference light pixel on a line different from a line connecting the first and second tilt-standard signal light pixels; and recording a first tilt-standard hologram in a region using the tilt-standard reference light pixel and the first tilt-standard signal light pixel, a second tilt-standard hologram in the same region using the tilt-standard reference light pixel and the second tilt-standard signal light pixel, a third tilt-standard hologram in the same region using the tilt-standard reference light pixel and the third tilt-standard signal light pixel, and a fourth tilt-standard hologram in the same region using the tilt-standard reference light pixel and the fourth tilt-standard signal light pixel.

With the holographic recording medium of the embodiment, the recording medium is manufactured by the process as follows. The process includes displaying at the spatial modulator the first and second tilt-standard signal light pixels arranged symmetrically to each other about the tilt-standard reference light pixel, and the third and fourth tilt-standard signal light pixels arranged symmetrically to each other about the tilt-standard reference light pixel on the line different from the line connecting the first and second tilt-standard signal light pixels; and recording the first to fourth tilt-standard holograms in the same region. With the holographic recording medium, a difference between a tilt amount during recording and a tilt amount during reproducing can be corrected.

A hologram recording/reproducing device according to another embodiment of the present invention includes an optical section which irradiates a holographic recording medium with an optical beam; a mechanical section; and a control unit which controls the optical section and the mechanical section. The optical section includes a variable wavelength laser light source, a wavelength of an optical beam of the variable wavelength laser light source being variable, a spatial modulator which modulates the optical beam, and an image pickup device which receives diffracted light from the holographic recording medium. The mechanical section includes a tilt control mechanism which controls a tilt amount of a recording surface of the holographic recording medium with respect to an attachment reference plane of the optical section. By controlling the spatial modulator, the control unit displays a tilt-standard reference light pixel and a tilt-standard signal light pixel having a ring shape and surrounding the tilt-standard reference light pixel. The control unit records a tilt-standard hologram using the tilt-standard reference light pixel and the tilt-standard signal light pixel. By controlling the spatial modulator, the control unit displays the tilt-standard reference light pixel. The control unit obtains a tilt angle, which is a tilt amount of the recording surface of the holographic recording medium with respect to the attachment reference plane of the optical section, and a tilt direction, in which tilting occurs, by a calculation using a position of a pixel which receives the diffracted light of the image pickup device.

With the hologram recording/reproducing device of the another embodiment, the control unit displays at the spatial modulator the tilt-standard reference light pixel and the tilt-standard signal light pixel having a ring shape and surrounding the tilt-standard reference light pixel, and records the tilt-standard hologram. For reproducing, the control unit obtains the tilt angle and the tilt direction by a calculation using the diffracted light from the tilt-standard hologram, and controls the tilt control mechanism to correct the difference between the tilt amount during recording and the tilt amount during reproducing. Accordingly, a difference between the tilt amount during recording and the tilt amount during reproducing can be corrected.

A hologram recording/reproducing device according to still another embodiment of the present invention includes an optical section which irradiates a holographic recording medium with an optical beam; and a control unit which controls the optical section. The optical section includes a laser light source which emits the optical beam, and a spatial modulator which modulates the optical beam. By controlling the spatial modulator, the control unit displays a tilt-standard reference light pixel and a tilt-standard signal light pixel. The control unit records a tilt-standard hologram using the tilt-standard reference light pixel and the tilt-standard signal light pixel.

With the hologram recording/reproducing device of the still another embodiment, the control unit displays at the spatial modulator the tilt-standard reference light pixel and the tilt-standard signal light pixel, and the tilt-standard hologram is recorded. During reproducing, a signal for tilt correction can be obtained from the hologram thusly recorded.

With the embodiments, the technique for recording/reproducing the tilt-standard hologram, detecting the difference between the tilt amount during recording and the tilt amount during reproducing, and correcting the tilt amount, is provided. Also, the holographic recording medium with the tilt-standard hologram recorded therein is provided. Accordingly, the recording/reproducing characteristic of the hologram can be increased.

DESCRIPTION OF THE PREFERRED EMBODIMENTS

Brief Description for Principle of Tilt Detection of Embodiment

The principle of tilt detection according to an embodiment will be described below. A technique for detecting tilting in the embodiment uses a holographic recording medium in which special information for tilt detection is recorded. The holographic recording medium uses a typical hologram recording layer in which a hologram is recorded. The shape of the holographic recording medium is a disk shape or a rectangular card shape, which is a typical shape of a holographic recording medium. After the holographic recording medium is manufactured, tilt-standard information, which serves as a standard of tilting, is recorded by a dedicated hologram recording/reproducing device before the holographic recording medium is shipped.

How tilt-standard information is recorded and how the tilt-standard information is reproduced will be described below. Beforehand, the hologram recording/reproducing device will be briefly described, which records a hologram in a holographic recording medium and reproduces the hologram recorded in the holographic recording medium.

Brief Description for Hologram Recording/Reproducing Device of Embodiment

Figure 1:
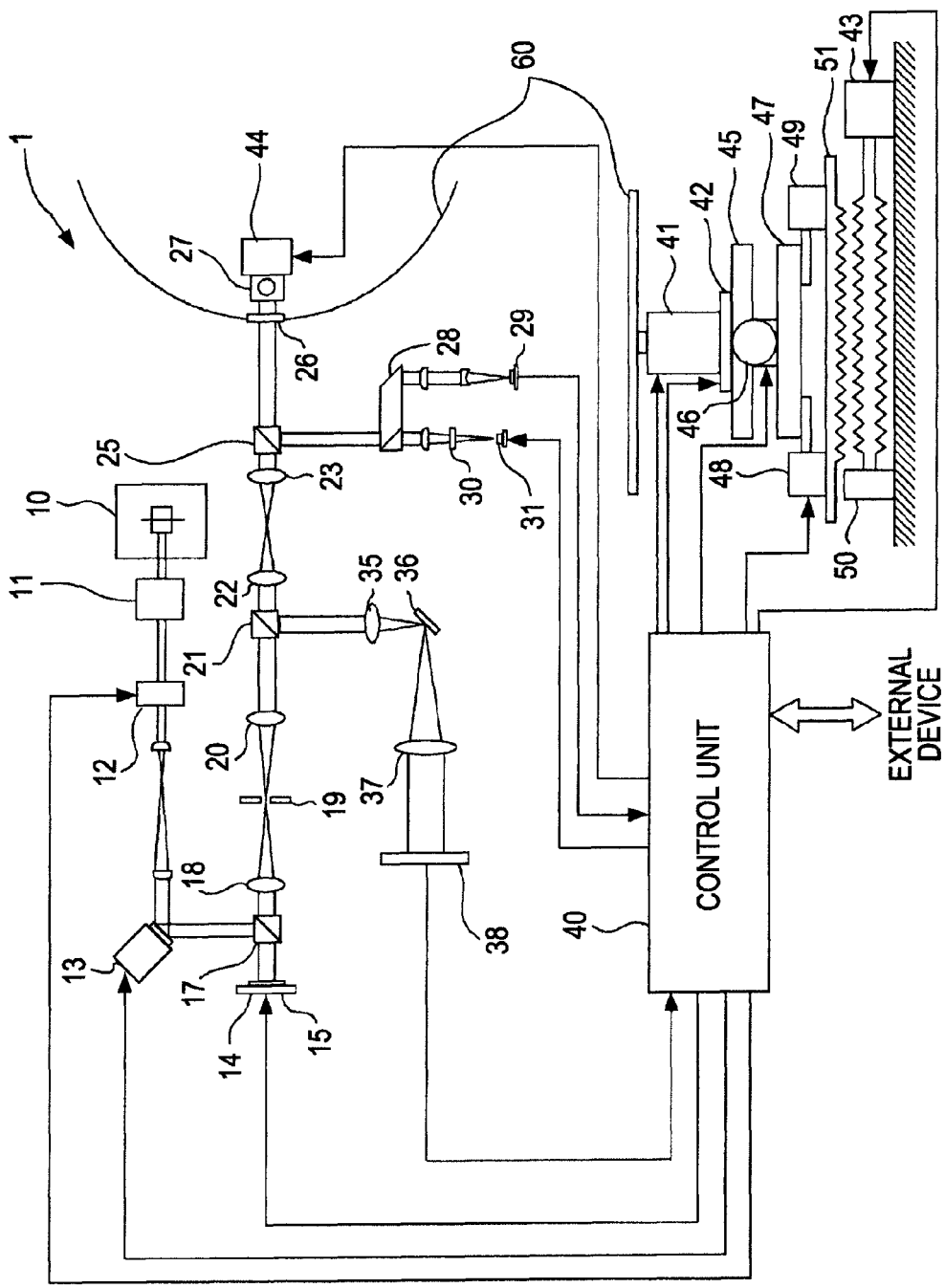
FIG. 1 illustrates a brief structure of a hologram recording/reproducing device according to an embodiment.

FIG. 1 illustrates a brief structure of a hologram recording/reproducing device 1 according to an embodiment. The hologram recording/reproducing device 1 functions as a hologram recording device which records a hologram and also functions as a hologram reproducing device which reproduces a hologram. Hereinafter, it is assumed that a hologram recording/reproducing device involves a hologram recording device, a hologram reproducing device, and a hologram recording/reproducing device. Also, it is assumed that a hologram recording/reproducing method involves a hologram recording method, a hologram reproducing method, and a hologram recording/reproducing method.

The hologram recording/reproducing device 1 shown in FIG. 1 includes the following optical components. An external-cavity diode laser (ECDL) 10 is a variable wavelength light source, in which a wavelength of an optical beam as laser light is variable. The ECDL 10 emits a blue optical beam. An isolator 11 is an optical element which prevents laser light from returning to the ECDL 10. A shutter 12 is an element which controls transmission and cutoff of the optical beam from the isolator 11. A galvanometer mirror 13 is an optical element which controls a direction of an optical beam using a rotatable mirror. A polarizing beam splitter (PBS) 17 is an optical member which transmits or reflects the optical beam depending on a polarizing direction of the optical beam. A spatial modulator 14 is formed of, for example, a ferroelectric liquid crystal. The spatial modulator 14 is an optical member which modulates the optical beam. A phase mask 15 is arranged near the spatial modulator 14. The phase mask 15 prevents the optical beam from being concentrated at a specific position of a holographic recording medium. A pinhole 19 is arranged between lenses 18 and 20. In addition, a polarizing beam splitter (PBS) 21, and lenses 22 and 23 are provided. A dichroic prism 25 having a wavelength selective film, a quarter-wave plate ($\lambda/4$ plate) 26, and an objective lens 27 are provided. A lens 35, a mirror 36, a lens 37, a complementary metal-oxide semiconductor camera (CMOS camera) 38 are provided.

As optical members for servo, a beam splitter 28, a photodetector (PD) 29, a grating 30, a red laser diode (red LD) 31 which emits a red optical beam are provided.

FIG. 1 contains an illustration in an upper part, in which a disk 60, i.e., a disk-shaped holographic recording medium, is viewed from a plane side, and an illustration in a lower part, in which the disk 60 is viewed from a cross-section side. Both disks 60 represent the same disk 60. The disk 60 illustrated in the upper part shows a relationship between the disk 60 and an optical section of the hologram recording/reproducing device 1. The disk 60 illustrated in the lower part shows a relationship between the disk 60 and mechanism members for servo.

The mechanism members of the hologram recording/reproducing device 1 include the following components, which are similar to those of a hologram recording/reproducing device of related art. A spindle motor 41 rotates the disk 60. A piezoelectric element 42 controls a distance between a hologram recording layer (see FIG. 4) of the disk 60 and the objective lens 27 in a focus direction. A slide motor 43 controls a large distance between the hologram recording layer of the disk 60 and the objective lens 27 in a tracking direction, and a tracking actuator 44 controls a small distance therebetween in the tracking direction. In addition, through not shown, a chucking mechanism is provided, which attaches or detaches the disk 60 to or from a rotary shaft of the spindle motor 41 such that a rotary shaft is aligned with a rotational center of the disk 60. The chucking mechanism has a structure similar to that of a chucking mechanism for attaching/detaching a DVD disk.

Featured mechanism members of the embodiment include two goniostages with variable angles in two directions orthogonal to each other, and motors for changing the angles of the goniostages, serving as tilt control mechanism members. The goniostages include an X-axis stage 45 and a Y-axis stage 47. The X-axis stage 45 can be smoothly and freely inclined in the X-axis direction (in a left-right direction of the drawing). The Y-axis stage 47 can be smoothly and freely inclined in the Y-axis direction (in a near-far direction of the drawing). An X-axis motor 46 applies an inclination driving force to the X-axis stage 45. A Y-axis motor 48 applies an inclination driving force to the Y-axis stage 47.

In addition, an X-axis bearing (not shown) faces the X-axis motor 46. An outer peripheral portion of the X-axis motor 46 and an outer peripheral portion of the X-axis bearing are retained to the Y-axis stage 47. A Y-axis bearing 49 faces the Y-axis motor 48. An outer peripheral portion of the Y-axis motor 48 and an outer peripheral portion of the Y-axis bearing 49 are slidably retained to a slidable portion 51. A rack provided at the slidable portion 51 meshes with a pinion provided at a rotary shaft of the slide motor 43. An outer peripheral portion of the slide motor 43 and an outer peripheral portion of a slide bearing 50 are retained to a reference plane of the hologram recording/reproducing device 1.

All the above-described optical members are retained to the reference plane of the hologram recording/reproducing device 1. Since the tilt control mechanism members are provided, a tilt amount of the disk 60 with respect to the optical members can be controlled independently in the X-axis direction and the Y-axis direction.

Though not shown, a control unit 40 includes a central processing unit (CPU), a random-access memory (RAM), a read-only memory (ROM), an analogue/digital (A/D) converter, a digital/analogue (D/A) converter, and an interface circuit. The control unit 40 drives the ECDL 10, the shutter 12, the galvanometer mirror 13, the spatial modulator 14, the red LD 31, the spindle motor 41, the piezoelectric element 42, the slide motor 43, and the tracking actuator 44. Thus, the control unit 40 has a driver for driving these components. Also, the control unit 40 includes a signal processing circuit for processing a signal from the CMOS camera 38 and outputs the processed signal to an external device. The control unit 40 also includes a servo processing circuit for performing a servo operation with a signal detected by the PD 29. The control unit 40 includes a control portion for controlling the entire operation of the hologram recording/reproducing device 1 in response to an instruction from the external device.

Further, the control unit 40 controls the X-axis motor 46 and the Y-axis motor 48 serving as the tilt control mechanism members. The control unit 40 controls tilting in the X-axis direction and tilting in the Y-axis direction, these two directions being orthogonal to each other. Consequently, tilt amounts of the disk 60 can be controlled in all directions in a two-dimensional plane with respect to the reference plane of the hologram recording/reproducing device 1.

(Recording Operation)

A recording operation for recording a hologram in the disk 60 will be described.

Figure 4:
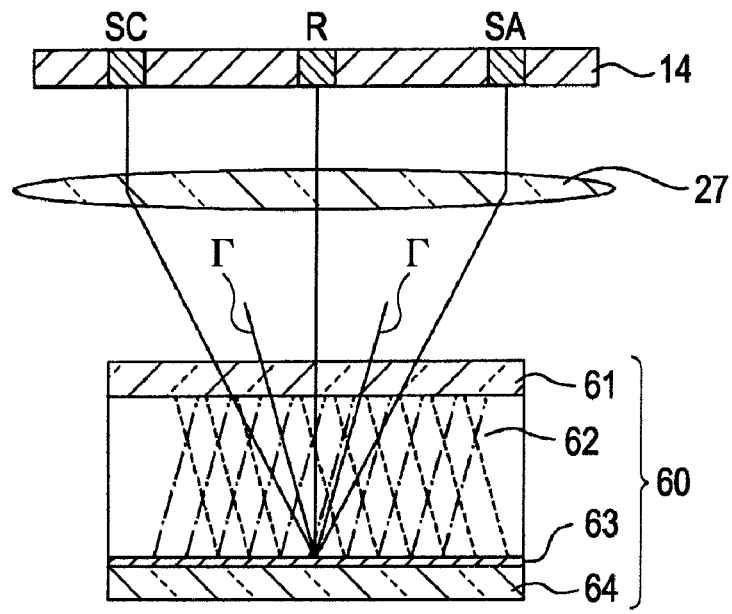
FIG. 4 schematically illustrates how a hologram is recorded.

For the recording operation, a servo system has to be operated such that a blue optical beam forms an optical spot at a predetermined position in the hologram recording layer (see a hologram recording layer 62 in FIG. 4). Although the detailed description of the operation of the servo system is omitted, the servo system is operable by using a red optical beam. For example, astigmatism method is used for focus servo, and push-pull method is used for tracking servo. A substrate (see a substrate 64 in FIG. 4) has pits or grooves (not shown). Address information to specify a position of the disk 60 can be obtained from the pits or grooves. A servo system is operated by using a red optical beam, and a recording/reproducing system is operated by using a blue optical beam. These techniques are commonly used art for a hologram recording/reproducing device.

Recording is basically performed while a tilt amount of the disk 60 in all directions with respect to the reference plane of the hologram recording/reproducing device 1 is 0° (degree) (an example of a tilt amount not being 0° will be described later as a modification). For recording, for example, the optical members may be arranged on a surface plate, and the piezoelectric element 42 may be directly arranged on the slidable portion 51. Accordingly, such recording is available. The tilt control mechanism members are provided for a reproducing operation. However, when a tilt amount is positively controlled during recording (as described later), the tilt control mechanism members are used even during recording. Since the hologram recording/reproducing device 1 includes the tilt control mechanism members, the control unit 40 controls the X-axis motor 46 and the Y-axis motor 48 such that the tilt amount in all directions is determined as 0° during recording. The wavelength of the optical beam emitted from the ECDL 10 during recording is a predetermined wavelength. It is assumed that the wavelength is 405 nm (nanometer). The wavelength of the optical beam from the ECDL 10 can be controlled with a control signal from the control unit 40. The ECDL 10 can emit the optical beam which is variable by about 6 nm at a pitch of about 40 pm (picometer).

For recording and reproducing, as described above, the red LD 31 emits the red optical beam and the PD 29 receives returning light of the red optical beam from the disk 60, so that focus servo, tracking servo, and slide servo are operated. The red optical beam does not form a hologram in the hologram recording layer (see FIG. 4). The red optical beam does not affect the recorded hologram, and hence, the servo system can be operated constantly stably.

Figure 2:
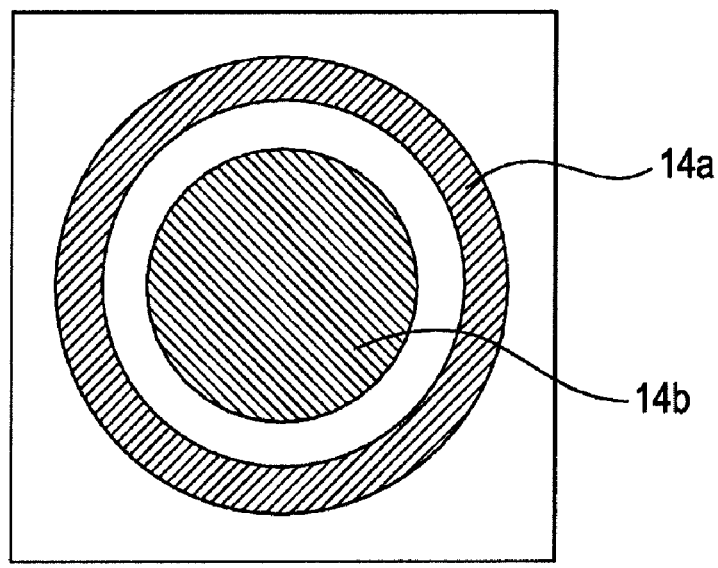
FIG. 2 is a conceptual diagram showing a pixel area of a spatial modulator.

FIG. 2 is a conceptual diagram showing a pixel area of the spatial modulator 14. The number of pixels is, for example, 1000×1000 pixels. When normal recording data is recorded or reproduced, a reference light region 14a corresponds to pixels for generating reference light and a signal light region 14b corresponds to pixels for generating signal light.

Figure 3:
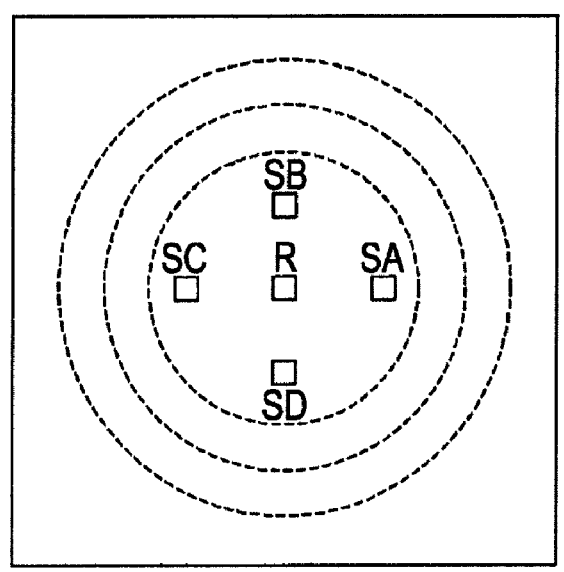
FIG. 3 is a conceptual diagram showing areas of the spatial modulator, the areas generating tilt-standard reference light and tilt-standard signal light when recording for tilt detection is carried out.

FIG. 3 shows a pattern to be displayed at the spatial modulator 14 which generates reference light (tilt-standard reference light) and signal light (tilt-standard signal light) when recording for tilt detection (tilt-standard recording) is carried out. Broken lines in FIG. 3 show a relationship between the reference light region 14a and the signal light region 14b during normal recording and reproducing shown in FIG. 2. An area surrounded by an innermost circle from among the broken lines is the signal light region 14b. An area between the innermost circle and a middle circle is an area in which no pattern is displayed on a pixel. An area between the middle circle and an outermost circle is the reference light region 14a. In tilt-standard recording, a pixel which generates the reference light is not limited to be within the reference light region for normal recording and reproducing. Also, pixels which generate the signal light are not limited to be within the signal light region for normal recording.

In FIG. 3, the pixel which generates the reference light (tilt-standard reference light) is a pixel R (a tilt-standard reference light pixel), and pixels which generate the signal light are a pixel SA (a first tilt-standard signal light pixel), a pixel SB (a third tilt-standard signal light pixel), a pixel SC (a second tilt-standard signal light pixel), and a pixel SD (a fourth tilt-standard signal light pixel). The pixels SA and SC are arranged in a line, and are symmetric to each other about the pixel R. That is, a distance from the pixel R to the pixel SA is equal to a distance from the pixel R to the pixel SC. The pixels SB and SD are arranged in a line, and are symmetric to each other about the pixel R. That is, a distance from the pixel R to the pixel SB is equal to a distance from the pixel R to the pixel SD.

In FIG. 3, the pixels R, SA, SB, SC, and SD are arranged in the signal light region 14b for normal recording and reproducing. However, the arrangement is not limited thereto. For example, the pixels R, SA, SB, SC, and SD may be arranged within a range of the reference light region 14a. Alternatively, the pixels R, SA, SB, SC, and SD may be arranged within a range of the reference light region 14a and the signal light region 14b.

FIG. 4 schematically illustrates how a hologram is recorded when the pixel pattern shown in FIG. 3 is displayed at the spatial modulator 14. FIG. 4 schematically illustrates cross sections (cross sections including the X-axis shown in FIG. 7) of optical beams passing through the pixels SA, R, and SC. The lines from the pixels SA, R, and SC each represent a single representative optical ray. The optical beam from the pixel R (the tilt-standard reference light) and the optical beam from the pixel SA (the first tilt-standard signal light) cause an interference fringe as indicated by dotted-chain lines. The interference fringe is recorded as a hologram (a first tilt-standard hologram) in a hologram recording layer 62 of the disk 60. The tilt-standard reference light from the pixel R and the optical beam from the pixel SC (the second tilt-standard signal light) cause an interference fringe as indicated by broken lines. The interference fringe is recorded as a hologram (a second tilt-standard hologram) in the hologram recording layer 62.

Similarly in the direction different by $\pi/2$ (the Y-axis direction), the tilt-standard reference light from the pixel R and the tilt-standard signal light from the pixel SB (the third tilt-standard signal light) cause an interference fringe. The interference fringe is recorded as a hologram (a third tilt-standard hologram) in the hologram recording layer 62. Also, the tilt-standard reference light from the pixel R and the tilt-standard signal light from the pixel SD (the fourth tilt-standard signal light) cause an interference fringe. The interference fringe is recorded as a hologram (a fourth tilt-standard hologram) in the hologram recording layer 62. The holograms (the first to fourth tilt-standard holograms) are formed in the same region in the hologram recording layer 62. After recording, post-exposure is performed to consume monomers in the region to prevent noise from being increased by the optical beam for reproducing. It is desirable that such recording of the tilt-standard holograms is performed at a plurality of positions of the disk 60. Here, each of the pixels R, SA, SB, SC, and SD corresponds to a single pixel of the spatial modulator 14.

Now, the structure of the disk 60 as a holographic recording medium shown in FIG. 4 is briefly described. The hologram recording layer 62 is formed between transparent substrates 61 and 64. A reflective film 63 is a wavelength selective film, which reflects the blue optical beam and transmits the red optical beam. The red optical beam transmitted through the wavelength selective film is reflected by a pit or groove (not shown) arranged in the substrate 64, and retrieves information necessary for servo and positional information of the hologram recording layer.

In the above description, how to record the tilt-standard hologram in the holographic recording medium has been described. The holographic recording medium, in which the tilt-standard hologram is recorded, can be provided to the market. In this case, subsequent recording/reproducing operations are performed by reproducing the tilt-standard hologram. Since tilt correction is applied, a recording/reproducing performance can be increased. In this case, the hologram recording/reproducing device mainly has a function of recording the tilt-standard hologram.

However, the hologram recording/reproducing device may record not only the tilt-standard hologram, but also recording data supplied from the external device. Even when the tilt-standard hologram is recorded in the holographic recording medium and the recording data from the external device is recorded in the holographic recording medium, an advantage similar to that obtained when the tilt-standard hologram is recorded can be attained. When the recording data recorded in the holographic recording medium is to be reproduced, a tilt detection signal is obtained from the tilt-standard hologram, and the tilt control mechanism is controlled in accordance with the tilt detection signal. Accordingly, when the recording data is to be reproduced by the hologram recording/reproducing device which has been recorded the data, or by other hologram recording/reproducing device, the recording data can be reliably reproduced.

(Reproducing Operation)

An operation for reproducing the disk 60 by the hologram recording/reproducing device 1 will be described, when a user purchases the disk 60, which has the tilt-standard hologram previously recorded therein as described above, or which has a tilt-standard hologram and a recording data hologram corresponding to recording data, both holograms being recorded by other hologram recording/reproducing device.

In the hologram recording/reproducing device 1, an optical beam with a wavelength of 405 nm is emitted on the tilt-standard hologram of the disk 60 while the pixel R represents a bright part (in a state where the pixel reflects the optical beam) and the pixels SA and SC represent dark parts (in a state where the pixel does not reflect the optical beam). If a relative tilt amount during recording and reproducing is 0, any of the four interference fringes (the tilt-standard holograms), including the interference fringe between the pixels R and SA, the interference fringe between the pixels R and SB, the interference fringe between the pixel R and SC, and the interference fringe between the pixels R and SD, satisfies the Bragg condition. Hence, pixels of the CMOS camera 38 corresponding to the pixels SA, SB, SC, and SD of the spatial modulator 14 receive diffracted light.

Figure 5:
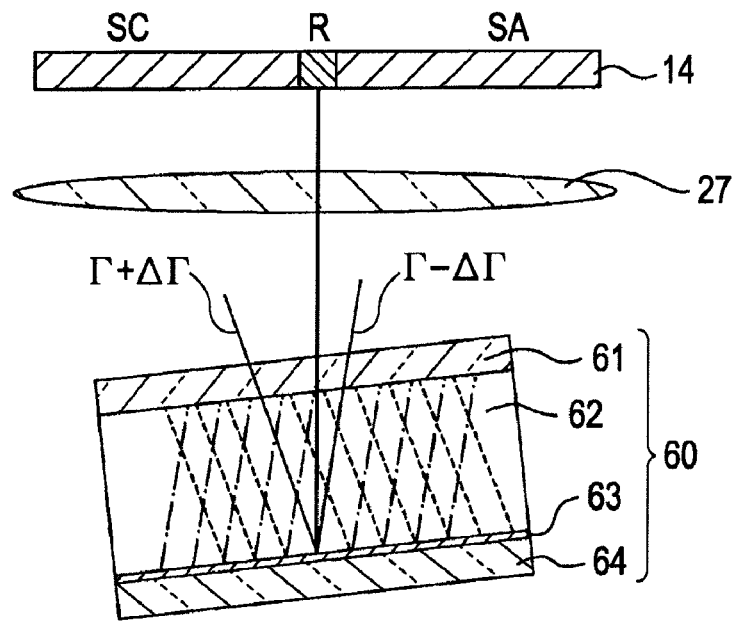
FIG. 5 schematically illustrates how a hologram is reproduced when a disk is tilted.

FIG. 5 schematically illustrates how a hologram is reproduced when the disk 60 is tilted by an angle $\Delta\Gamma$. In this case, when the optical beam with the wavelength of 405 nm is emitted, the interference fringe between the pixels R and SA and the interference fringe between the pixels R and SC do not satisfy the Bragg condition. Hence, diffracted light is not generated. However, if the wavelength of the optical beam is continuously varied from 402 to 408 nm (actually, being discretely varied at a pitch of 40 pm, regarding the characteristic of the ECDL 10), an optical beam with a specific wavelength generates diffracted light.

Figure 6A:
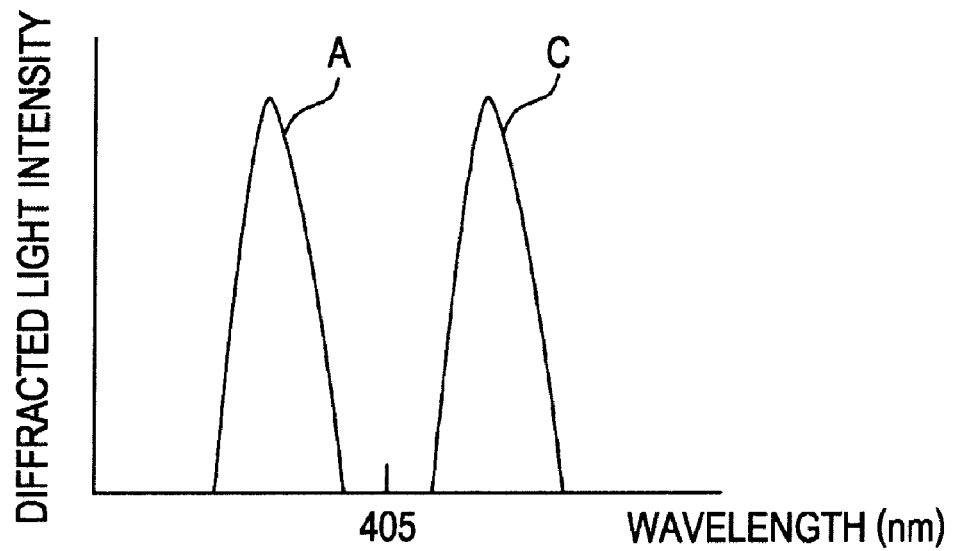
FIGS. 6A and 6B illustrate relationships between wavelengths of optical beams and diffracted light intensities.
Figure 6B:
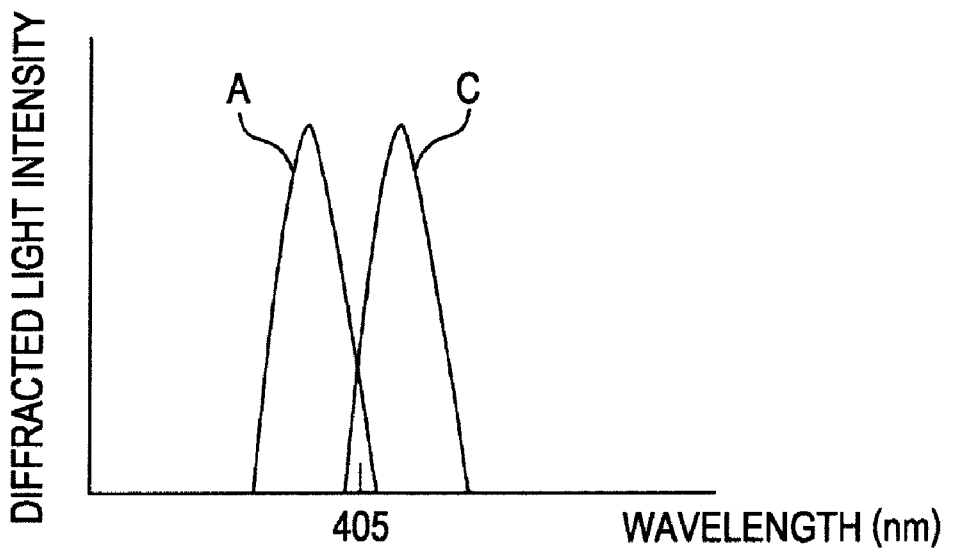

FIGS. 6A and 6B illustrate relationships between wavelengths of optical beams and diffracted light intensities. A graph A plots a diffracted light intensity of diffracted light corresponding to the interference fringe between the pixels R and SA. A graph C plots a diffracted light intensity of a diffracted light corresponding to the interference fringe between the pixels R and SC. The positions where the CMOS camera 38 receives the diffracted lights differ from each other. The positions of the diffracted lights correspond to the positions of the pixels SA and SC of the spatial modulator 14. FIG. 6A is a graph when a tilt angle is large. FIG. 6B is a graph when a tilt angle is small. The tilt angle is briefly described below, and then, the current description is continued.

Figure 7:
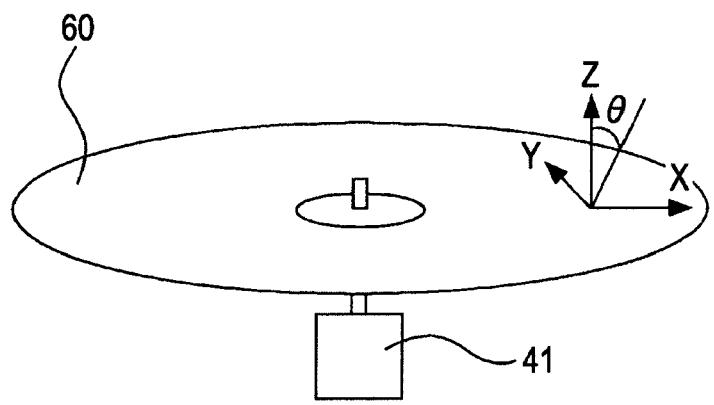
FIG. 7 illustrates a definition of a tilt angle.

FIG. 7 illustrates a definition of a tilt angle θ. FIG. 7 schematically shows three-direction axes of X-, Y-, and Z-axes. The X- and Y-axes are contained in the reference plane of the optical system. The Z-axis is an axis orthogonal to the reference plane of the optical system. The tilt angle (indicated by θ) is an angle defined by a plane of the hologram recording layer 62 and the reference plane of the optical system. In FIG. 7, the tilt angle is 0.

A phenomenon where two peaks appear as shown in the graphs A and C in FIGS. 6A and 6B can be described as follows. Assuming that an interference fringe has a period d, a relationship between an incident angle $\Gamma$ and a wavelength $\lambda$ of reference light for generating diffracted light is expressed by Equation (1).

$$2d \sin \Gamma = \lambda \qquad \text{Equation (1)}$$

Here, when the incident angle is changed to $\Gamma \pm \Delta\Gamma$, a relationship of Equation (2) is established.

$$2d \sin(\Gamma \pm \Delta\Gamma) = \lambda \pm \Delta\lambda \qquad \text{Equation (2)}$$

As expressed by Equation (2), the wavelength for generating the diffracted light is changed to $\lambda \pm \Delta\lambda$. When a condition of $\Delta\delta \ll 1$ is established, Equation (2) is developed to Equation (3).

$$2d\{\sin\Gamma \pm (\cos\Gamma)\Delta\Gamma\} = \lambda \pm \Delta\lambda \quad \text{Equation (3)}$$

By subtracting Equation (1) from Equation (3), Equation (4) is obtained.

$$2d(\cos\Gamma)\Delta\Gamma = \Delta\lambda \quad \text{Equation (4)}$$

When d is eliminated from Equation (1) or (4), Equation (5) or (6) is obtained.

$$\Delta\lambda = \frac{\lambda}{\tan\Gamma}\Delta\Gamma \quad \text{Equation (5)}$$

$$\Delta\Gamma = \frac{\tan\Gamma}{\lambda}\Delta\lambda \quad \text{Equation (6)}$$

Regarding Equation (5), because of the term of $\tan\Gamma$, a sensitivity (tilt detection accuracy) is decreased as the pixel SA is away from the center of the spatial modulator 14. In particular, the tilt detection accuracy is decreased by the reason as follows. As the pixel SA is away from the center of the spatial modulator 14, the variation in wavelength expressed in Equation (5) is decreased. Meanwhile, the variation in wavelength discretely appears at a pitch of 40 pm. Thus, when the variation in wavelength in Equation (5) is small, the resolution is decreased accordingly.

Proportionality coefficients of $\Delta\lambda$ and $\Delta\Gamma$ in Equation (5) for a typical example are considered. The consideration is based on the case where the objective lens 27 has a numerical aperture (NA) of 0.6, and the pixel SA is arranged at an end of the signal light region 14b (at a position closest to the reference light region 14a). In this case, an incident angle $\psi$ in the air is expressed by Equation (7).

$$\sin\psi = 0.6 \quad \text{Equation (7)}$$

Assuming that a refractive index n of the disk is 1.5, an incident angle $\Psi$ in the disk is expressed by Equation (8) on the basis of Snell's law.

$$\frac{\sin\psi}{\sin\Psi} = n \quad \text{Equation (8)}$$

By Equation (8), $\Psi = 0.41$ rad. A grating angle $\Gamma$ is an average of an incident angle 0 rad from the pixel R and an incident angle $\Psi$. Hence, $\Gamma = 0.21$ rad is established. Substituting 405 nm to $\lambda$, and substituting a wavelength accuracy 0.04 nm (40 pm) of the ECDL 10 to $\Delta\lambda$, the result corresponds to $\Delta\Gamma = 2.1\text{E-}5$ rad $= 0.0012°$. That is, the tilt amount between the recording surface of the hologram recording layer 62 of the disk 60 and the reference plane of the optical system can be measured with an accuracy one-digit higher than that of 0.01°, which is the accuracy necessary for tilt detection.

The description provided hereinbefore presumed that the recorded interference fringe is not changed when it is reproduced. Hence, $\Delta\lambda$ could have been considered as a shift from the wavelength of 405 nm. Actually, the recording layer may be contracted during recording, and the recording layer may be subjected to thermal contraction or thermal expansion because of a temperature difference between a temperature during recording and a temperature during reproducing. An optimum reproduction wavelength may be deviated from 405 nm. In this case, $\Delta\lambda$ is expressed by Equation (9).

$$\Delta\lambda = \frac{\lambda_{peak\_of\_C} - \lambda_{peak\_of\_A}}{2} \quad \text{Equation (9)}$$

Herein, $\lambda_{peak\_of\_C}$ is a wavelength corresponding to the peak of the graph C in FIGS. 6A and 6B. Also, $\lambda_{peak\_of\_A}$ is a wavelength corresponding to the peak of the graph A in FIGS. 6A and 6B. In the embodiment, $\Delta\lambda$ is obtained by Equation (9), the obtained value is converted into the tilt amount $\Delta\Gamma$ by Equation (6), and the tilt amount is adjusted to 0° by adjustment with the goniostage, i.e., the X-axis stage 45. The tilt amount in this case is a difference between a tilt amount during recording and a tilt amount during reproducing. A line connecting the pixels SA, R, and SC is aligned with an inclination direction in which the X-axis stage 45 can provide adjustment. That is, the tilt direction detected from the holograms formed by the pixels SA, R, and SC is aligned with the direction in which tilting can be controlled. The X-axis stage 45 is adjusted by feedforward. The control unit 40 controls a rotational angle of the X-axis motor 46 and properly adjusts an inclination angle of the X-axis stage 45, in accordance with the tilt amount (tilt angle) detected with the CMOS camera 38.

Similarly, the tilt direction detected from the holograms formed by the pixels SB and R, and pixels SD and R is aligned with the direction in which the tilt can be controlled. That is, the control unit 40 controls the rotational angle of the Y-axis motor 48 and properly adjusts the inclination angle of the Y-axis stage 47, in accordance with the tilt amount (tilt angle) in the Y-axis direction detected with the CMOS camera 38.

Figure 8:
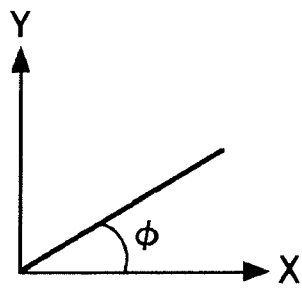
FIG. 8 illustrates a definition of a tilt direction angle.

FIG. 8 illustrates a definition of a tilt direction angle $\phi$. The tilt direction angle is, for example, represented such that an angle in the X-axis direction is 0°. In particular, the tilt angle (indicated by $\theta$) shown in FIG. 7 represents the tilt amount (tilt angle), whereas the tilt direction angle (indicated by $\phi$) shown in FIG. 8 represents the direction in which tilting occurs, with respect to the X-axis.

The control unit 40 detects a tilt detection signal including a tilt direction angle, on the basis of a diffracted light intensity detected from a predetermined pixel of the CMOS camera 38. The control unit 40 divides the tilt detection signal into tilt component signals in the X- and Y-axis directions. The X-axis motor 46 is controlled by the tilt component signal in the X-axis direction, and the Y-axis motor 48 is controlled by the tilt component signal in the Y-axis direction.

To be more specific, the control unit 40 corrects the tilt amount by controlling the respective parts as follows. First, tilt correction in the X-axis direction is described.

(1) The control unit 40 controls the ECDL 10, to set the wavelength of the optical beam to, for example, 402 nm.

(2) The control unit 40 detects a level (diffracted light intensity) of diffracted light (first diffracted light) obtained from a pixel CSA (not shown) of the CMOS camera 38 corresponding to the pixel SA of the spatial modulator 14, and a level (diffracted light intensity) of diffracted light (second diffracted light) obtained from a pixel CSC (not shown) of the CMOS camera 38 corresponding to the pixel SC of the spatial modulator 14. The first diffracted light is diffracted light obtained from the first tilt-standard hologram, and the second diffracted light is diffracted light obtained from the second tilt-standard hologram.

(3) The control unit 40 stores the level of the first diffracted light and the level of the second diffracted light in the RAM.

(4) The control unit 40 controls the ECDL 10, to set the wavelength of the optical beam to be slightly larger.

(5) The control unit 40 repeats the processing from (2) to (4) until the wavelength of the optical beam becomes 408 nm. The control unit 40 stores the relationship between the wavelength and the diffracted light intensity as shown in FIGS. 6A and 6B in the RAM.

(6) The control unit 40 obtains $\lambda_{peak\_of\_A}$ which is a wavelength of the optical beam causing the level of the first diffracted light to be highest, and $\lambda_{peak\_of\_C}$ which is a wavelength of the optical beam causing the level of the second diffracted light to be highest.

(7) The control unit 40 performs calculation of Equation (9), thereby obtaining a value of $\Delta\lambda$.

(8) The control unit 40 obtains $\Delta\Gamma$, which is a tilt correction amount corresponding to the value of $\Delta\lambda$, by Equation (6). Then, the control unit 40 reads a tilt amount, by which the X-axis stage 45 is inclined, from a table in the RAM. The control unit 40 controls the X-axis motor 46 so that the X-axis stage 45 is inclined by a desirable angle.

Thus, the operation for tilt correction in the X-axis direction is completed.

Tilt correction in the Y-axis direction can be performed similarly.

(1) The control unit 40 controls the ECDL 10, to set the wavelength of the optical beam to, for example, 402 nm.

(2) The control unit 40 detects diffracted light (third diffracted light) obtained from a pixel CSB (not shown) of the CMOS camera 38 corresponding to the pixel SB of the spatial modulator 14, and diffracted light (fourth diffracted light) obtained from a pixel CSD (not shown) of the CMOS camera 38 corresponding to the pixel SD of the spatial modulator 14. The third diffracted light is diffracted light obtained from the third tilt-standard hologram, and the fourth diffracted light is diffracted light obtained from the fourth tilt-standard hologram.

(3) The control unit 40 stores the level of the third diffracted light and the level of the fourth diffracted light in the RAM.

(4) The control unit 40 controls the ECDL 10, to set the wavelength of the optical beam to be slightly larger.

(5) The control unit 40 repeats the processing from (2) to (4) until the wavelength of the optical beam becomes 408 nm. The control unit 40 stores the relationship between the wavelength and the diffracted light intensity as shown in FIGS. 6A and 6B in the RAM.

(6) The control unit 40 obtains $\lambda_{peak\_of\_B}$ which is a wavelength of the optical beam causing the level of the third diffracted light to be highest, and $\lambda_{peak\_of\_D}$ which is a wavelength of the optical beam causing the level of the fourth diffracted light to be highest.

(7) The control unit 40 performs calculation of Equation (9), thereby obtaining a value of $\Delta\lambda$.

(8) The control unit 40 obtains $\Delta\Gamma$, which is a tilt correction amount corresponding to the value of $\Delta\lambda$, by Equation (6). Then, the control unit 40 reads a tilt amount, by which the Y-axis stage 47 is inclined, from a table in the RAM. The control unit 40 controls the Y-axis motor 48 so that the Y-axis stage 47 is inclined by a desirable angle. Thus, the operation for tilt correction in the Y-axis direction is completed.

In the above-described embodiment, the tilt-standard signal light pixels arranged at the spatial modulator 14 are symmetrically arranged about the tilt-standard reference light pixel, not only to detect a variation in tilt amount between the tilt amount during recording and the tilt amount during reproducing and correct the variation, but also to correct an equivalent variation in tilt amount resulted from deformation of the hologram because of a difference between a temperature during recording and a temperature during reproducing. If the temperature is not changed, in the pattern of the spatial modulator 14 shown in FIG. 3, one of the pixels SA and SC, which are symmetrically arranged about the pixel R, may be omitted. Similarly, one of the pixels SB and SD may be omitted. Even with this configuration, the tilt amount can be detected unless the shape of the hologram is changed.

To detect the tilt amount in the X-axis direction, the diffracted light intensity of the diffracted light from the hologram formed by the pixel R and one of the pixels SA and SC is used. In particular, during reproducing, without performing the calculation for obtaining a difference as expressed by Equation (9), the tilt amount can be detected from a difference between a wavelength of an optical beam corresponding to a peak of diffraction intensity during recording and a wavelength of an optical beam corresponding to a peak of diffraction intensity during reproducing. The tilt amount in the Y-axis direction can be similarly detected. Further, when tilting occurs in only one of the X- and Y-axis directions, the pixel R and one of the pixels SA and SC may be displayed at the spatial modulator 14, and the tilt amount in the X-axis direction may be canceled. Also, the pixel R and one of the pixels SB and SD may be displayed at the spatial modulator 14, and the tilt amount in the Y-axis direction may be canceled.

(Modifications when Tilt-standard Amount is 0°)

As mentioned above, modifications, for the embodiment when the tilt-standard amount is 0°, will be described with reference to FIGS. 9 to 12. When the tilt-standard amount is 0°, recording is performed with a tilt angle (see FIG. 7) being 0°.

Figure 9:
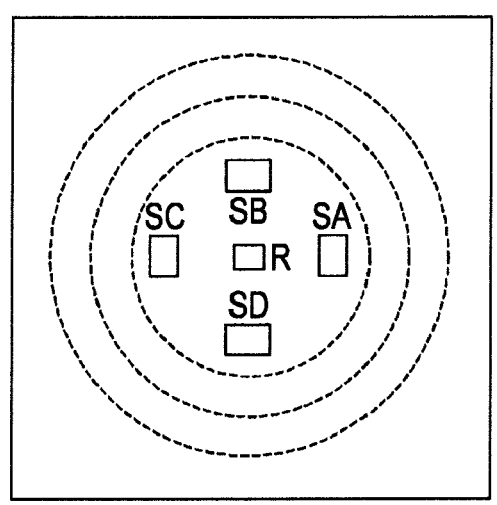
FIG. 9 illustrates a display pattern of the spatial modulator when a tilt-standard reference light pixel and a tilt-standard signal light pixel for recording a tilt-standard hologram each are formed of a plurality of pixels.

FIG. 9 illustrates a display pattern of the spatial modulator 14 when a tilt-standard reference light pixel which generates tilt-standard reference light, and a tilt-standard signal light pixel which generates tilt-standard signal light, for recording the tilt-standard hologram each are formed of a plurality of pixels. In the modification shown in FIG. 9, pixels R, SA, SB, SC, and SD each are formed of a plurality of pixels. For example, the pixels R, SA, SB, SC, and SD may have the same size, and the size may be m×n pixels (m, n being integers). However, all pixels do not have to have the same size. For example, the pixel R may have a size of 4×4 pixels, whereas the pixels SA, SB, SC, and SD each may have a size of 1×10 pixels. In this case, at least the pixels SA, SB, SC, and SD desirably have the same size. If the pixels have different sizes, the heights and half-widths of the graphs A and C shown in FIGS. 6A and 6B become different, and it is difficult to handle such pixels.

Figure 10:
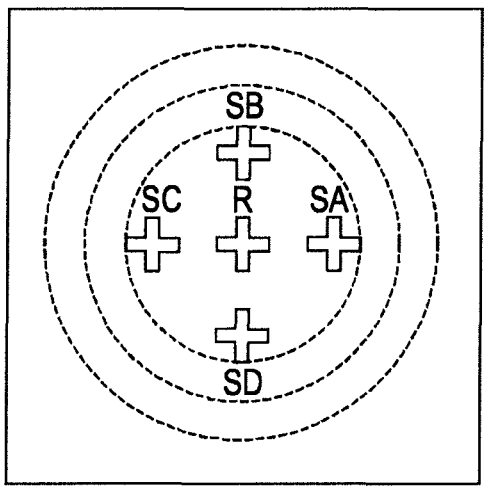
FIG. 10 illustrates a display pattern of the spatial modulator when a tilt-standard reference light pixel and a tilt-standard signal light pixel for recording a tilt-standard hologram each are formed of pixels in a cross shape.

FIG. 10 illustrates a display pattern of the spatial modulator 14 when a tilt-standard reference light pixel formed of a plurality of pixels, and a tilt-standard signal light pixel formed of a plurality of pixels, for recording a tilt-standard hologram each are formed of pixels in a cross shape. In the modification shown in FIG. 10, pixels displayed at the spatial modulator 14 are arranged in a cross shape. Like the embodiment, the shape of pixels does not have to be a rectangle, and may be a cross, a triangle, or a pentagon.

Figure 11:
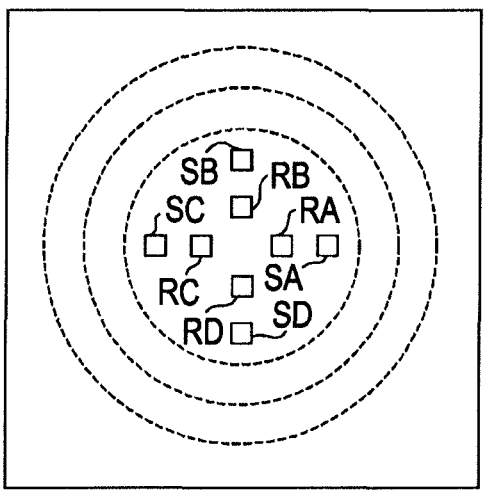
FIG. 11 illustrates a display pattern of the spatial modulator when tilt-standard reference light pixels for recording tilt-standard holograms are provided in a plurality of regions.

FIG. 11 illustrates a display pattern of the spatial modulator when tilt-standard reference light pixels for recording tilt-standard holograms are provided in a plurality of regions. In the modification shown in FIG. 11, the number of reference light pixels, which generate tilt-standard reference light displayed at the spatial modulator 14, is not one, but plural. Pixels RA, RB, RC, and RD are pixels corresponding to reference light. During recording, the pixels RA and SA form an interference fringe, the pixels RB and SB form an interference fringe, the pixels RC and SC form an interference fringe, and pixels RD and SD form an interference fringe.

During reproducing, the pixels RA, RB, RC, and RD simultaneously generate reference light, to obtain tilt detection signals.

Here, during recording, when reference light and signal light corresponding to all pixels are simultaneously generated, for example, an interference fringe between the pixels RA and SB may be also formed. A tilt detection signal of one axis may be mixed to a tilt detection signal of the other axis. Hence, as described above, reference light from one reference light pixel and signal light from corresponding one signal light pixel form an interference fringe. As mentioned above, the positional relationship between the tilt-standard reference light pixel and the tilt-standard signal light pixel is not particularly limited. Hence, in FIG. 10, the pixel corresponding to the reference light may be switched with the pixel corresponding to the signal light. During reproducing, the pixels SA, SB, SC, and SD may generate reference light. With this configuration, operation is performed similarly.

Figure 12:
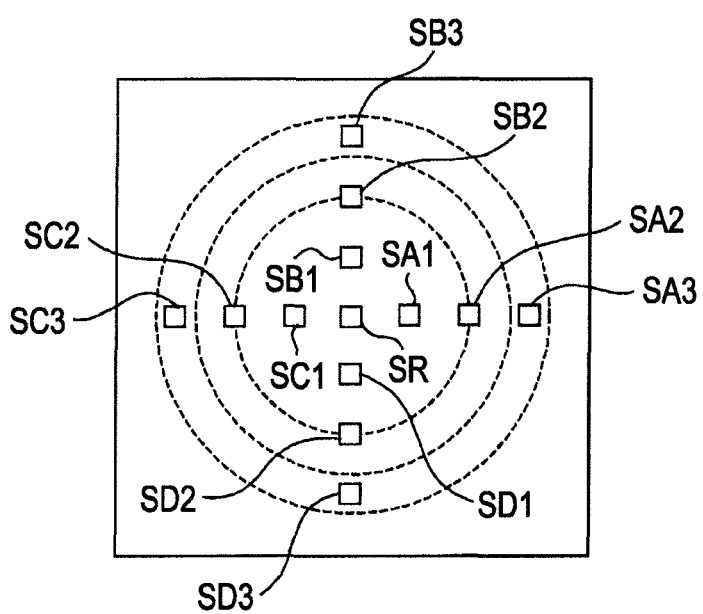
FIG. 12 illustrates a display pattern of the spatial modulator when tilt-standard signal light pixels for recording tilt-standard holograms are provided in a plurality of regions.

FIG. 12 illustrates a display pattern of the spatial modulator 14 when tilt-standard signal light pixels for recording tilt-standard holograms are provided in a plurality of regions such that at least two pixels are arranged along each axis. In the modification shown in FIG. 12, pixel SR and SA1 form an interference fringe, pixels SR and SA2 form an interference fringe, and pixels SR and SA3 form an interference fringe. Similarly, pixel SR and SB1 form an interference fringe, pixels SR and SB2 form an interference fringe, and pixels SR and SB3 form an interference fringe. Similarly, pixel SR and SC1 form an interference fringe, pixels SR and SC2 form an interference fringe, and pixels SR and SC3 form an interference fringe. Similarly, pixel SR and SD1 form an interference fringe, pixels SR and SD2 form an interference fringe, and pixels SR and SD3 form an interference fringe.

In this way, an interference fringe (hologram) is formed, and during reproducing, the pixel SR generates reference light. Accordingly, a variable range of an optical beam necessary for tilt detection can match with a tilt detection accuracy. That is, although the accuracy of a tilt detection signal detected from diffracted light which forms an image at an outer peripheral portion of the CMOS camera 38 is low, detection is still available even with a small variable range of laser wavelengths. In contrast, although the accuracy of a tilt detection signal detected from diffracted light which forms an image at an inner peripheral portion (center portion) of the CMOS camera 38 is high, if the tilt amount is large, detection is not available unless the variable range of the laser wavelengths is large.

In particular, the accuracy of tilt detection signals obtained from a hologram formed by the pixels SR and SA3, a hologram formed by the pixels SR and SB3, a hologram formed by the pixels SR and SC3, and a hologram formed by the pixels SR and SD3, is the lowest. In contrast, the accuracy of tilt detection signals obtained from a hologram (first tilt-standard hologram) formed by the pixels SR and SA1, a hologram (third tilt-standard hologram) formed by the pixels SR and SB1, a hologram (second tilt-standard hologram) formed by the pixels SR and SC1, and a hologram (fourth tilt-standard hologram) formed by the pixels SR and SD1, is the highest. Also, the accuracy of tilt detection signals obtained from a hologram (fifth tilt-standard hologram) formed by the pixels SR and SA2, a hologram (seventh tilt-standard hologram) formed by the pixels SR and SB2, a hologram (sixth tilt-standard hologram) formed by the pixels SR and SC2, and a hologram (eighth tilt-standard hologram) formed by the pixels SR and SD2, is a middle accuracy.

Using this, a variable range of an optical beam necessary for tilt detection matches with a tilt detection accuracy, thereby detecting a tilt detection signal highly accurately, and correcting tilting highly accurately. First, tilt correction in the X-axis direction is described. The tilt correction is properly performed with three steps.

In a first step, the control unit 40 obtains tilt detection signals from diffracted light from the interference fringe formed by the pixels SR and SA3, and diffracted light from the interference fringe formed by the pixels SR and SC3. Then, the control unit 40 controls the X-axis motor 46 on the basis of the tilt detection signals, and changes inclination of the X-axis stage 45 so that a difference between a tilt amount during recording and a tilt amount during reproducing becomes 0. Here, since the variable range of the optical beam necessary for the tilt detection may be small, the tilt detection signals can be obtained although the difference between the tilt amounts is large. As described above, the first-step tilt correction with the lowest accuracy is performed.

In a second step, the control unit 40 obtains tilt detection signals from diffracted light from the interference fringe formed by the pixels SR and SA2 (fifth tilt-standard signal light pixel), and diffracted light from the interference fringe formed by the pixels SR and SC2 (sixth tilt-standard signal light pixel). Here, since the rough correction has been performed in the first step, the tilt detection signals in the second step can be obtained. Then, the control unit 40 controls the X-axis motor 46 on the basis of the tilt detection signals, and changes inclination of the X-axis stage 45 so that the tilt amount becomes 0. As described above, the second-step tilt correction with a higher accuracy is performed.

In a third step, the control unit 40 obtains tilt detection signals from diffracted light from the interference fringe formed by the pixels SR and SA1 (first tilt-standard signal light pixel), and diffracted light from the interference fringe formed by the pixels SR and SC1 (second tilt-standard signal light pixel). Here, since the more accurate correction has been performed in the second step, the tilt detection signals in the third step can be obtained. Then, the control unit 40 controls the X-axis motor 46 on the basis of the tilt detection signals, and changes inclination of the X-axis stage 45 so that the tilt amount becomes 0. As described above, the third-step tilt correction with the highest accuracy is performed.

In this way, through the plurality of steps, the tilt detection signals with higher accuracies are obtained from different interference fringes, to sequentially perform tilt corrections with higher accuracies. When the variable width of the optical beam from the ECDL 10 is small, even if the number of steps for variable wavelengths is small, the tilt correction with a high accuracy can be performed. In the above-described embodiment, tilt correction is carried out with the three steps. However, the number of steps is not limited thereto. The tilt correction can be performed with a high accuracy with a desired number of steps.

Next, tilt correction in the Y-axis direction is described. The tilt correction is properly performed with three steps.

In a first step, the control unit 40 obtains tilt detection signals from diffracted light from the interference fringe formed by the pixels SR and SB3, and diffracted light from the interference fringe formed by the pixels SR and SD3. Then, the control unit 40 controls the Y-axis motor 48 on the basis of the tilt detection signals, and changes inclination of the Y-axis stage 47 so that a difference between a tilt amount during recording and a tilt amount during reproducing becomes 0. Here, since the variable range of the optical beam necessary for the tilt detection may be small, the tilt detection signals can be obtained although the difference between the tilt amounts is large. As described above, the first-step tilt correction with the lowest accuracy is performed.

In a second step, the control unit 40 obtains tilt detection signals from diffracted light from the interference fringe formed by the pixels SR and SB2 (seventh tilt-standard signal light pixel), and diffracted light from the interference fringe formed by the pixels SR and SD2 (eighth tilt-standard signal light pixel). Here, since the rough correction has been performed in the first step, the tilt detection signals in the second step can be obtained. Then, the control unit 40 controls the Y-axis motor 48 on the basis of the tilt detection signals, and changes inclination of the Y-axis stage 47 so that the tilt amount becomes 0. As described above, the second-step tilt correction with a higher accuracy is performed.

In a third step, the control unit 40 obtains tilt detection signals from diffracted light from the interference fringe formed by the pixels SR and SB1 (third tilt-standard signal light pixel), and diffracted light from the interference fringe formed by the pixels SR and SD1 (fourth tilt-standard signal light pixel). Here, since the more accurate correction has been performed in the second step, the tilt detection signals in the third step can be obtained. Then, the control unit 40 controls the Y-axis motor 48 on the basis of the tilt detection signals, and changes inclination of the Y-axis stage 47 so that the tilt amount becomes 0. As described above, the third-step tilt correction with the highest accuracy is performed.

In this way, through the plurality of steps, the tilt detection signals with higher accuracies are obtained from different interference fringes, to sequentially perform tilt corrections with higher accuracies. When the variable width of the optical beam from the ECDL 10 is small, even if the number of steps for variable wavelengths is small, the tilt correction with a high accuracy can be performed. In the above-described embodiment, tilt correction is carried out with the three steps. However, the number of steps is not limited thereto. The tilt correction can be performed with a high accuracy with a desired number of steps.

Though not shown, in the above description, the pixels which generate the reference light for the tilt signal detection, and the pixels which generate the signal light for the tilt signal detection, at the spatial modulator 14 are arranged in the X- and Y-axis directions. However, the pixels for generating the reference light and the pixels for generating the signal light may not be arranged in the four directions including positive and negative sides in the X-axis direction, and positive and negative sides in the Y-axis direction. For example, reference light pixels and signal light pixels for tilt-amount detection may be arranged in a larger number of directions (multiple directions), such as in six or eight directions, and interference fringes (holograms) may be formed by thusly arranged reference light pixels and signal light pixels.

When interference fringes are formed in the multiple directions, the following advantage can be attained. For example, in the case of the four directions, when a tilt direction is arranged between the X- and Y-axis directions and recorded diffraction gratings are thin (when desirable interference fringes which provide diffracted light with a large S/N is not formed), it is difficult to obtain a desirable tilt detection signal. That is, a light-receiving amount of diffracted light detected by a pixel of the CMOS camera 38, the pixel corresponding to a tilt-standard signal light pixel of the spatial modulator 14, becomes small, and a degree of a tilt detection signal also becomes small. Even in this situation, tilt detection signals can be easily obtained as long as a tilt-standard reference light pixel and a tilt-standard signal light pixel are arranged in an intermediate direction between the X- and Y-axis directions.

In the above-described embodiment, the tilt-standard hologram is recorded with the optical beam having the wavelength of 405 nm. However, when the tilt-standard hologram is recorded with the wavelength of 405 nm, if the temperature during reproducing is different from that during recording, an intermediate wavelength between the peak of the graph A and the peak of the graph C in FIGS. 6A and 6B is no longer 405 nm. Hence, when the optical beam with the wavelength of 405 nm is used during recording, although the wavelength is changed in a range of from 402 to 408 nm during reproducing, for example, only a signal shown in the graph A in FIGS. 6A and 6B may be obtained. To address this, the tilt-standard hologram may be recorded with optical beams with a plurality of wavelengths, such as 402, 403, 404, 405, 406, 407, and 408 nm.

During reproducing, for example, when the wavelength of the optical beam is changed in the range of from 402 to 408 nm, both signals plotted by the graphs A and C shown in FIGS. 6A and 6B can be obtained. In the coaxial interference method, shift multiplexing recording is available. Hence, even when recording is performed as described above, the area to be used for recording the tilt-standard hologram is not significantly changed.

Figure 13:
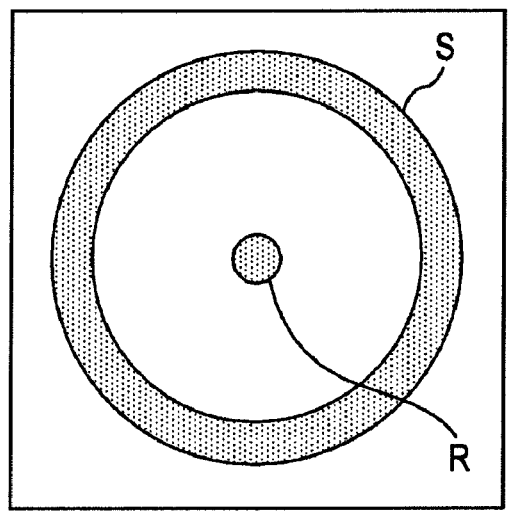
FIG. 13 illustrates a display pattern of the spatial modulator when a region of a tilt-standard signal light pixel for recording a tilt-standard hologram has a ring shape.

FIG. 13 illustrates a display pattern of a spatial modulator 14 when a region of a tilt-standard signal light pixel for recording a tilt-standard hologram has a ring shape. This is another embodiment of arrangement of a pixel R which generates reference light for tilt detection and a pixel S which generates signal light for tilt detection, on the basis of the above-mentioned technical idea. The embodiment shown in FIG. 13 is equivalent to a configuration in which directions are maximally increased, and hence infinite detection directions are provided. Thus, various arrangements for a pixel which generates reference light for tilt detection (tilt-standard reference light pixel) and a pixel which generates signal light for tilt detection (tilt-standard signal light pixel) are conceivable. Further, the above-described basic modifications may be combined. The basic idea is that pixels are arranged to detect tilt detection signals, and the control unit 40 processes the tilt detection signals so that a mechanism which controls tilting decreases the degree of the tilt detection signals.

Embodiment when Tilt-standard Amount is not 0°

In the various embodiment and modifications described above, the tilt-standard reference light pixel and the tilt-standard signal light pixel in various forms are used to record the interference fringes (holograms) while the tilt-standard amount is 0° during recording. Then, during reproducing, the tilt detection signal is obtained from the diffracted light from the thusly recorded interference fringe, and the tilt amount during reproducing is set to 0. However, the angle (tilt angle) defined between the reference plane of the optical system and the disk 60 is affected by a variation between hologram recording/reproducing devices. Further, the tilt angle is affected by a variation occurring depending on a combination of a hologram recording/reproducing device and a disk. Hence, when the tilt amount is further increased, the tilt-standard amount during recording may be set to not only 0°, but also, −0.2°, −0.1°, 0.1°, 0.2°, etc.

Figure 14:
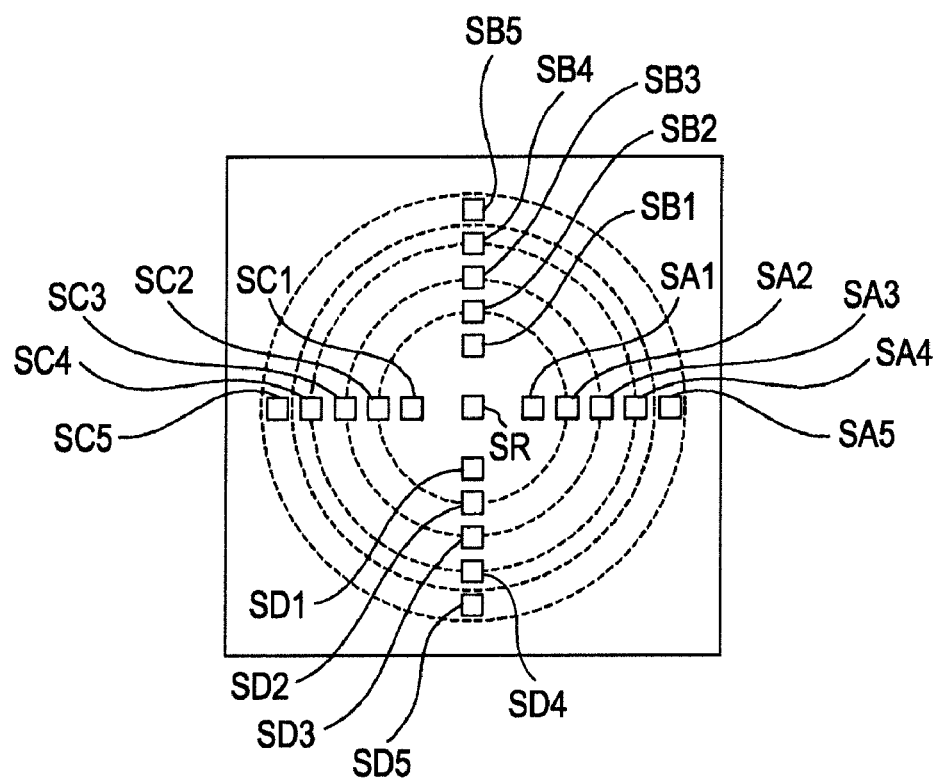
FIG. 14 illustrates a display pattern of the spatial modulator when tilt-standard signal light pixels for recording tilt-standard holograms are arranged in different regions depending on tilt-standard amounts.

FIG. 14 illustrates a display pattern of a spatial modulator 14 when a tilt-standard reference light pixel and a tilt-standard signal light pixel are displayed with a pixel corresponding to an angle of the tilt-standard amount other than 0°. For example, recording is performed with pixels SA1, SB1, SC1, and SD1 for generating signal light when a tilt-standard amount is −0.2°. Also, recording is performed with pixels SA2, SB2, SC2, and SD2 for generating signal light with a tilt-standard amount of −0.1°. Also, recording is performed with pixels SA3, SB3, SC3, and SD3 for generating signal light with a tilt-standard amount of 0°. Also, recording is performed with pixels SA4, SB4, SC4, and SD4 for generating signal light with a tilt-standard amount of 0.1°. Also, recording is performed with pixels SA5, SB5, SC5, and SD5 for generating signal light with a tilt-standard amount of 0.2°.

In this way, multiplexing recording (for example, shift multiplexing recording) is performed for five types of interference fringes for −0.2°, −0.1°, 0°, 0.1°, and 0.2°. The tilt-standard amount for reproducing may be obtained from the position of the pixel which provides diffracted light most suitable for reproducing. For example, when an amount of diffracted light from the interference fringe recorded with the tilt-standard amount of −0.2° is largest, and it is detected that a tilt-standard amount is shifted by 0.03°, the actual tilt amount is 0.23, and hence the tilt amount may be corrected by −0.23°, thereby setting tilting to 0°. The tilt angle optimum for reproducing can be obtained as a position of a pixel of the CMOS camera 38 for detecting diffracted light.

Figure 15:
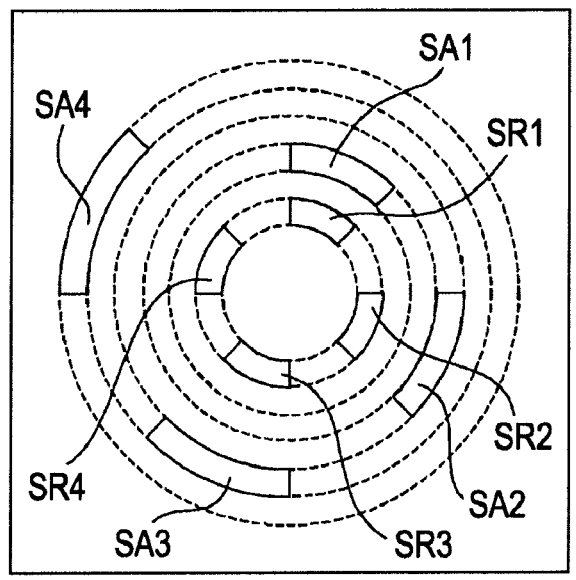
FIG. 15 illustrates another display pattern of the spatial modulator when tilt-standard signal light pixels for recording tilt-standard holograms are arranged in different regions depending on tilt-standard amounts.

FIG. 15 illustrates another display pattern of the spatial modulator 14 when a tilt-standard reference light pixel and a tilt-standard signal light pixel for recording tilt-standard holograms are displayed with a pixel corresponding to an angle of the tilt-standard amount other than 0°. For example, recording is performed with a pixel SA1 for generating signal light and a pixel SR1 for generating reference light with a tilt-standard amount of −0.2°. Also, recording is performed with a pixel SA2 for generating signal light and a pixel SR2 for generating reference light with a tilt-standard amount of −0.1°. Also, recording is performed with a pixel SA3 for generating signal light and a pixel SR3 for generating reference light with a tilt-standard amount of 0°. Also, recording is performed with a pixel SA4 for generating signal light and a pixel SR4 for generating reference light with a tilt-standard amount of 0.1°. With such recording, an image obtained from the diffracted light with the CMOS camera 38 during reproducing expands along a circumference of a pixel of the spatial modulator 14 for generating signal light. Hence, the tilt detection signal can be further easily detected.

Embodiment of Combination of Case where Tilt-standard Amount is 0° and Case where Tilt-standard Amount is not 0°

Tilt correction may be performed by combining a technique for detecting tilt amounts during reproducing with diffracted light from interference fringes recorded with a plurality of tilt-standard amounts, and a technique for detecting tilt amounts such that a wavelength of an optical beam of diffracted light from an interference fringe recorded with a tilt-standard amount of 0° is changed during reproducing.
(Another Technique for Tilt Correction to Set Tilt Amount to be 0)

Referring to FIG. 6B, a technique is described for tilt correction having a characteristic suitable for a case where a tilt amount is small, and the graphs A and C overlap with each other. In this case, tilt correction can be performed with a feedback control system. Tilt correction is performed on the basis of Equations (10) and (11). Here, reference character A denotes a peak value of the graph A, and C denotes a peak value of the graph C.

$T_1 = A - C$ Equation (10)

$T_2 = A + C$ Equation (11)

The tilt amount is corrected as follows.
First, the wavelength of the optical beam from the ECDL 10 is changed so that $T_1$ becomes 0. Specifically, the following feedback control is performed within a range where bottom portions of the graphs A and C overlap with each other. The control unit 40 performs calculation in which a level of diffracted light caused by a pixel of the CMOS camera 38 for detecting the graph C is subtracted from a level of diffracted light caused by a pixel of the CMOS camera 38 for detecting the graph A, to obtain a wavelength control signal for controlling a wavelength of an optical beam. The wavelength control signal, which is the result of subtraction, is fed back to the ECDL 10. With the feedback control, the wavelength control signal can be finally set to 0. That is, a peak value A of the graph A can be equal to a peak value C of the graph C.

Next, the tilt amount is adjusted so that $T_2$ (or one of A and C) becomes largest. Specifically, the X-axis motor 46 is slightly moved (that is, the tilt amount of the X-axis stage 45 is slightly changed), and it is determined whether $T_2$ (or one of A and C) at this time is increased. If $T_2$ is increased, the X-axis motor 46 is slightly moved in the same direction. This operation is one type of feedback control called hill-climbing method. Similarly, in the Y-axis direction, the Y-axis motor 48 is slightly moved, to find a point at which $T_2$ (or one of A and C) becomes largest. As described above, with the feedback control system, an optimum point for the tilt angle (point at which diffraction efficiency becomes maximum during reproducing) can be found. With the feedback control, the peak value A of the graph A and the peak value C of the graph C can become finally largest.

As described above, the feedback control is performed so that $T_2$ becomes largest while $T_1$ is 0. The positions of the X-stage and Y-stage are fixed. Then, through an operation of reproducing, the difference between the tilt amount during recording and the tilt amount during reproducing can be approximated to 0. Here, activation and deactivation of the two feedback systems may be switched as follows. The feedback system is activated when reproducing is started, so that the peak values A and C become substantially equal. When the peak value A or C becomes a substantially peak value, the feedback system is stopped, and the current condition is maintained. Then, if an error rate of a reproducing signal falls within a predetermined range, reproducing is continued in this state. If the error rate of the reproducing signal exceeds the predetermined range, the feedback system is activated again, to find an optimum tilt angle.
(Still Another Technique for Tilt Correction with Tilt Amount of 0)

Described below is a technique for directly detecting a tilt angle θ and a tilt direction angle φ with a tilt-standard hologram recorded by displaying the pattern shown in FIG. 13 at the spatial modulator 14.

After the tilt angle θ and the tilt direction angle φ are detected, both may be corrected by feedforward. The tilt angle θ may be obtained as a vector sum of an inclination angle of the X-axis stage 45 and an inclination angle of the Y-axis stage 47. The tilt direction angle φ may be obtained as a ratio of the inclination angle of the X-axis stage 45 to the inclination angle of the Y-axis stage 47. Thusly, the control unit 40 can detect the tilt angle θ which is the difference between the tilt angle during recording and the tilt angle during reproducing, and the tilt direction angle φ which is the difference between the tilt direction angle during recording and the tilt direction angle during reproducing, and easily correct the difference to 0 by the feedforward control. In addition, for example, the inclination angle of the X-axis state 45 and the inclination angle of the Y-axis stage 47 may be detected by sensors (not shown). In this case, the control unit 40 can correct the difference to 0 by the feedback control while the control unit 40 monitors signals from the sensors.

The above-described idea will be described with reference to the tilt angle θ and the tilt direction angle φ shown in FIGS. 7 and 8. In the embodiment, a tilt-standard hologram previously recorded in a holographic recording medium to be employed is recorded by displaying the tilt-standard reference light pixel and the tilt-standard signal light pixel as shown in FIG. 13 at the spatial modulator 14. When the tilt angle (tilt amount) of the disk 60 with respect to the reference plane of the optical system is 0, the X-axis extends along a radial direction of the disk 60, the Y-axis extends along a rotation direction of the disk 60, and the Z-axis extends perpendicularly to the surface of the hologram recording layer 62 of the disk 60. Assuming that n represents a unit vector for a disk normal, Equation (12) is obtained.

$$n = (\sin\theta\cos\phi, \sin\theta\sin\phi, \cos\theta) \quad \text{Equation (12)}$$

Assuming that $\epsilon_x$ represents an angle tilted from the Z-axis to the X-axis direction, and $\epsilon_y$ represents an angle tilted to the Y-axis direction, Equations (13) and (14) are obtained.

$$\tan\epsilon_x = \frac{n_x}{n_z} = \tan\theta\cos\phi \quad \text{Equation (13)}$$

$$\tan\epsilon_y = \frac{n_y}{n_z} = \tan\theta\sin\phi \quad \text{Equation (14)}$$

With a relationship of $\epsilon_x \ll 1, \epsilon_y \ll 1, \theta \ll 1$, approximations of Equations (15) and (16) can be obtained.

$$\epsilon_x = \theta\cos\phi \quad \text{Equation (15)}$$

$$\epsilon_y = \theta\sin\phi \quad \text{Equation (16)}$$

Figure 16:
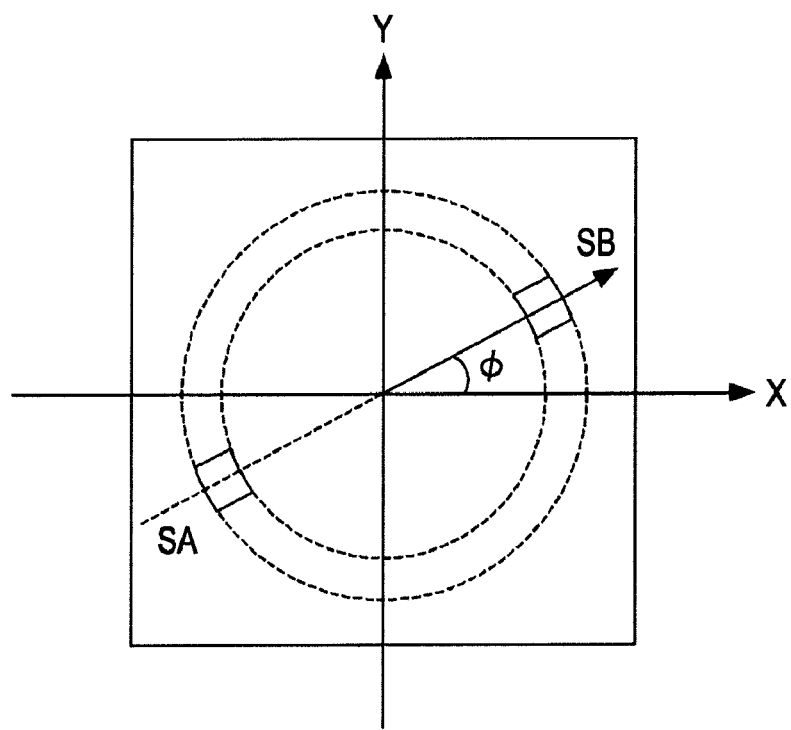
FIG. 16 illustrates an image of a CMOS camera to obtain a tilt angle and a tilt direction angle.

FIG. 16 illustrates an image of the CMOS camera 38 to obtain a tilt angle θ and a tilt direction angle φ. FIG. 16 illustrates an image obtained with the CMOS camera 38 by detecting a diffraction image from a tilt-standard hologram recorded by displaying the pattern shown in FIG. 13 at the spatial modulator 14. To be more specific, the tilt angle θ and the tilt direction angle φ are determined as follows.

The control unit 40 controls the ECDL 10 to sweep a wavelength of an optical beam. By changing the wavelength of the optical beam, diffracted light is generated at the CMOS camera 38 as shown in FIG. 16. Pixels SA and SB of the CMOS camera 38 do not receive diffracted light simultaneously. Along with sweeping of the wavelength of the optical beam, intensities of diffracted light to be emitted on the pixels SA and SB are varied. A wavelength of the optical beam causing the diffracted light received by the pixel SA and the diffracted light received by the pixel SB to be equal is found. The wavelength of the optical beam is fixed, and then a next step is carried out.

The control unit 40 provides weighting for the positions of the pixels which receive the diffracted light and averages the positions, to specify the pixels SA and SB which receive the diffracted light. The control unit 40 calculates an angle defined between a segment connecting the pixels SA and SB and the X-axis, thereby obtaining the tilt direction angle φ. The tilt angle θ corresponds to ΔΓ expressed in Equation (5), and the tilt angle θ can be obtained from Δλ. Using the obtained tilt angle θ and tilt direction angle φ, $\epsilon_x$ and $\epsilon_y$ are calculated by Equations (15) and (16). Hence, the X-axis stage 45 and the Y-axis stage 47 (goniometer) is inclined to cause the tilt amount to be 0.

Next, a holographic recording medium of the embodiment will be described. As mentioned above, by using a holographic recording medium in which a tilt-standard hologram is recorded by displaying the tilt-standard reference light pixel and the tilt-standard signal light pixel at the spatial modulator, the difference between the tilt amount during recording and the tilt amount during reproducing can be basically 0. Here, in normal recording/reproducing, a reference light region (pixel of normal reference light region) to record/reproduce recording data, and a signal light region (pixel of normal signal light region) to record recording data are used to form an interference fringe (recording data hologram). A tilt amount is detected by forming an interference fringe (tilt-standard hologram) using a tilt-standard reference light pixel and a tilt-standard signal light pixel. To obtain a desirable tilt detection signal, the positional relationship between the tilt-standard reference light pixel and the tilt-standard signal light pixel may be limited. That is, the tilt-standard reference light pixel and the tilt-standard signal light pixel are arranged at optimum positions in an entire surface of the spatial modulator.

Hence, a holographic recording medium, in which both recording data hologram and tilt-standard hologram are recoded, may have a feature different from that of a holographic recording medium of related art. There are two points to be considered. First, when the tilt-standard hologram and the recording data hologram are formed in the same region, it is difficult to obtain a tilt detection signal with a high accuracy. Second, in a case where the holographic recording medium is reproduced, a region of a CMOS camera, serving as an image pickup device, for receiving diffracted light when the recording data hologram is reproduced may differ from a region of the CMOS camera when the tilt detection signal is detected.

To address the bottleneck caused by the first point, in the holographic recording medium of the embodiment, the position in the hologram recording layer at which the recording data hologram is formed is separated from the position in the hologram layer at which the tilt-standard hologram is formed, so that only one type of the holograms is formed in the common region. Also, to address the bottleneck caused by the second point, in the holographic recording medium of the embodiment, the position in the hologram recording layer at which the tilt-standard hologram is formed is specified. Alternatively, the position in the hologram recording layer at which the recording data hologram is formed may be specified. However, the forming region of the tilt-standard hologram uses a smaller amount of storage capacity. Hence, the specification is easier. The position of the hologram is specified on the basis of information contained in a pit or groove formed in a substrate.

That is, the holographic recording medium of the embodiment has a feature in which the tilt-standard hologram is formed in the predetermined forming region of the tilt-standard hologram. The tilt-standard hologram may be recorded with a tilt amount of 0° during recording. Alternatively, the tilt-standard hologram may be recorded with a predetermined tilt amount other than 0° during recording.

With the holographic recording medium of the embodiment, even when the tilt amount during recording is different from the tilt amount during reproducing, a good recording/reproducing characteristic can be obtained by using the hologram recording/reproducing device and the hologram recording/reproducing method of the embodiment.

The present application contains subject matter related to that disclosed in Japanese Priority Patent Application JP 2008-208699 filed in the Japan Patent Office on Aug. 13, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A hologram recording/reproducing device, comprising:
an optical section which irradiates a holographic recording medium with an optical beam; and
a control unit which controls the optical section,
wherein the optical section includes
a laser light source which emits the optical beam, and
a spatial modulator which modulates the optical beam,
wherein the control unit generates a tilt-standard reference light pixel, first and second tilt-standard signal light pixels arranged symmetrically to each other about the tilt-standard reference light pixel, and third and fourth tilt-standard signal light pixels arranged symmetrically to each other about the tilt-standard reference light pixel on a line different from a line connecting the first and second tilt-standard signal light pixels, and
wherein the control unit records a first tilt-standard hologram in a region using the tilt-standard reference light pixel and the first tilt-standard signal light pixel, a second tilt-standard hologram in the same region using the tilt-standard reference light pixel and the second tilt-standard signal light pixel, a third tilt-standard hologram in the same region using the tilt-standard reference light pixel and the third tilt-standard signal light pixel, and a fourth tilt-standard hologram in the same region using the tilt-standard reference light pixel and the fourth tilt-standard signal light pixel.

2. The hologram recording/reproducing device according to claim 1, further comprising:
a variable wavelength laser light source as the laser light source, a wavelength of the optical beam of the variable wavelength laser light source being variable;
a tilt control mechanism which controls a tilt amount of a recording surface of the holographic recording medium with respect to an attachment reference plane of the optical section; and
an image pickup device which receives diffracted light from the holographic recording medium,
wherein, by controlling the spatial modulator, the control unit displays the tilt-standard reference light pixel,
wherein the control unit detects, from the image pickup device, diffracted light intensities of first diffracted light from the first tilt-standard hologram, second diffracted light from the second tilt-standard hologram, third diffracted light from the third tilt-standard hologram, and fourth diffracted light from the fourth tilt-standard hologram,
wherein, by controlling the variable wavelength laser light source, the control unit control varies the wavelength of the optical beam, and detects a first wavelength which is a wavelength of an optical beam causing the diffracted light intensity of the first diffracted light to be largest, a second wavelength which is a wavelength of an optical beam causing the diffracted light intensity of the second diffracted light to be largest, a third wavelength which is a wavelength of an optical beam causing the diffracted light intensity of the third diffracted light to be largest, and a fourth wavelength which is a wavelength of an optical beam causing the diffracted light intensity of the fourth diffracted light to be largest, and
wherein the control unit controls the tilt control mechanism on the basis of correction tilt amounts corresponding to a difference between the first and second wavelengths and a difference between the third and fourth wavelengths.

3. The hologram recording/reproducing device according to claim 1, further comprising:
a variable wavelength laser light source as the laser light source, a wavelength of the optical beam of the variable wavelength laser light source being variable;
a tilt control mechanism which controls a tilt amount of a recording surface of the holographic recording medium with respect to an attachment reference plane of the optical section; and
an image pickup device which receives diffracted light from the holographic recording medium,
wherein, by controlling the spatial modulator, the control unit displays the tilt-standard reference light pixel,
wherein the control unit detects, from the image pickup device, diffracted light intensities of first diffracted light from the first tilt-standard hologram, second diffracted light from the second tilt-standard hologram, third diffracted light from the third tilt-standard hologram, and fourth diffracted light from the fourth tilt-standard hologram,
wherein, by controlling the variable wavelength laser light source, the control unit varies the wavelength of the optical beam, and detects a first wavelength which is a wavelength of an optical beam causing the diffracted light intensity of the first diffracted light to be largest, a second wavelength which is a wavelength of an optical beam causing the diffracted light intensity of the second diffracted light to be largest, a third wavelength which is a wavelength of an optical beam causing the diffracted light intensity of the third diffracted light to be largest, and a fourth wavelength which is a wavelength of an optical beam causing the diffracted light intensity of the fourth diffracted light to be largest,
wherein the control unit causes an optical beam to be emitted, the optical beam having a wavelength which causes the diffracted light intensities of the first and second diffracted light to be equal,
wherein the control unit controls the tilt control mechanism so that the diffracted light intensities of the first and second diffracted light become largest,
wherein the control unit causes an optical beam to be emitted, the optical beam having a wavelength which causes the diffracted light intensities of the third and fourth diffracted light to be equal, and
wherein the control unit controls the tilt control mechanism so that the diffracted light intensities of the third and fourth diffracted light become largest.

4. A hologram recording/reproducing method, comprising the steps of:
emitting an optical beam from a laser light source;
providing a tilt-standard reference light pixel, first and second tilt-standard signal light pixels arranged symmetrically to each other about the tilt-standard reference light pixel, and third and fourth tilt-standard signal light pixels arranged symmetrically to each other about the tilt-standard reference light pixel on a line different from a line connecting the first and second tilt-standard signal light pixels; and
recording a first tilt-standard hologram in a region using the tilt-standard reference light pixel and the first tilt-standard signal light pixel, a second tilt-standard hologram in the same region using the tilt-standard reference light pixel and the second tilt-standard signal light pixel, a third tilt-standard hologram in the same region using the tilt-standard reference light pixel and the third tilt-standard signal light pixel, and a fourth tilt-standard hologram in the same region using the tilt-standard reference light pixel and the fourth tilt-standard signal light pixel.

5. A holographic recording medium formed by a process comprising the steps of:
 emitting an optical beam from a laser light source;
 providing a tilt-standard reference light pixel, first and second tilt-standard signal light pixels arranged symmetrically to each other about the tilt-standard reference light pixel, and third and fourth tilt-standard signal light pixels arranged symmetrically to each other about the tilt-standard reference light pixel on a line different from a line connecting the first and second tilt-standard signal light pixels; and
 recording a first tilt-standard hologram in a region using the tilt-standard reference light pixel and the first tilt-standard signal light pixel, a second tilt-standard hologram in the same region using the tilt-standard reference light pixel and the second tilt-standard signal light pixel, a third tilt-standard hologram in the same region using the tilt-standard reference light pixel and the third tilt-standard signal light pixel, and a fourth tilt-standard hologram in the same region using the tilt-standard reference light pixel and the fourth tilt-standard signal light pixel.

6. A hologram recording/reproducing device, comprising:
 an optical section which irradiates a holographic recording medium with an optical beam;
 a mechanical section; and
 a control unit which controls the optical section and the mechanical section,
 wherein the optical section includes
  a variable wavelength laser light source, a wavelength of an optical beam of the variable wavelength laser light source being variable,
  a spatial modulator which modulates the optical beam, and
  an image pickup device which receives diffracted light from the holographic recording medium,
 wherein the mechanical section includes
  a tilt control mechanism which controls a tilt amount of a recording surface of the holographic recording medium with respect to an attachment reference plane of the optical section,
 wherein the control unit controls a tilt-standard reference light pixel and a tilt-standard signal light pixel having a ring shape and surrounding the tilt-standard reference light pixel,
 wherein the control unit records a tilt-standard hologram using the tilt-standard reference light pixel and the tilt-standard signal light pixel,
 wherein the control unit obtains a tilt angle, which is a tilt amount of the recording surface of the holographic recording medium with respect to the attachment reference plane of the optical section, and a tilt direction, in which tilting occurs, by a calculation using a position of a pixel which receives the diffracted light of the image pickup device, and
 wherein the control unit controls the tilt control mechanism in accordance with the obtained tilt angle and the tilt direction.

7. A hologram recording/reproducing device, comprising:
 an optical section which irradiates a holographic recording medium with an optical beam; and
 a control unit which controls the optical section,
 wherein the optical section includes
  a laser light source which emits the optical beam, and
  a spatial modulator which modulates the optical beam,
 wherein the control unit controls a tilt-standard reference light and a tilt-standard signal light, and
 wherein the control unit records a first tilt-standard hologram in a region using the tilt-standard reference light and a first tilt-standard signal light, a second tilt-standard hologram in the same region using the tilt-standard reference light and a second tilt-standard signal light, a third tilt-standard hologram in the same region using the tilt-standard reference light and a third tilt-standard signal light, and a fourth tilt-standard hologram in the same region using the tilt-standard reference light pixel and a fourth tilt-standard signal light.

8. The hologram recording/reproducing device according to claim 7, further comprising:
 a variable wavelength laser light source as the laser light source, a wavelength of the optical beam of the variable wavelength laser light source being variable;
 a tilt control mechanism which controls a tilt amount of a recording surface of the holographic recording medium with respect to an attachment reference plane of the optical section; and
 an image pickup device which receives diffracted light from the holographic recording medium,
 wherein, by controlling the spatial modulator, the control unit displays the tilt-standard reference light pixel,
 wherein the control unit detects, from the image pickup device, a diffracted light intensity of the diffracted light,
 wherein, by controlling the wavelength variable laser light source, the control unit varies the wavelength of the optical beam and detects a wavelength of an optical beam causing the diffracted light intensity to be largest, and
 wherein the control unit controls the tilt control mechanism on the basis of a correction tilt amount corresponding to a difference between a wavelength of an optical beam during recording and a wavelength of an optical beam causing the diffracted light intensity to be largest during reproducing.

* * * * *